United States Patent
Nii

(10) Patent No.: US 11,155,651 B2
(45) Date of Patent: Oct. 26, 2021

(54) MODIFIED VINYL ALCOHOL POLYMER AND METHOD FOR PRODUCING SAME

(71) Applicant: KURARAY CO., LTD., Kurashiki (JP)

(72) Inventor: Shinsuke Nii, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/969,745

(22) PCT Filed: Feb. 5, 2019

(86) PCT No.: PCT/JP2019/004051
§ 371 (c)(1),
(2) Date: Aug. 13, 2020

(87) PCT Pub. No.: WO2019/159757
PCT Pub. Date: Aug. 22, 2019

(65) Prior Publication Data
US 2021/0002392 A1    Jan. 7, 2021

(30) Foreign Application Priority Data
Feb. 14, 2018   (JP) .............................. JP2018-023904

(51) Int. Cl.
*C08F 8/36*     (2006.01)
*C08F 16/06*    (2006.01)

(52) U.S. Cl.
CPC ................ *C08F 8/36* (2013.01); *C08F 16/06* (2013.01)

(58) Field of Classification Search
CPC .................................... C08F 8/36; C08F 16/06
See application file for complete search history.

(56) References Cited

FOREIGN PATENT DOCUMENTS

| CN | 105431460 A | 3/2016 |
|---|---|---|
| JP | 56-72006 A | 6/1981 |
| JP | 7-118407 A | 5/1995 |
| JP | 10-101729 A | 4/1998 |
| JP | 11-279831 A | 10/1999 |
| JP | 2001-220411 A | 8/2001 |
| JP | 2001-220411 A | 8/2001 |
| JP | 2006-291161 A | 10/2006 |
| JP | 2014-198767 A | 10/2014 |

OTHER PUBLICATIONS

Unitika Chem KK, electronic translation of JP 10-101729, Apr. 1998.*
International Search Report dated Mar. 12, 2019 in PCT/JP2019/004051 filed on Feb. 5, 2019, 1 page.
International Search Report dated Mar. 12, 2019 in PCT/JP2019/004051 filed Feb. 5, 2019, 1 page.
"Poval," Kobunshi Kanko Kai, 1984, pp. 246-249 (4 total pages).
Moritani, T. et al., "$^{13}C$- and $^{1}H$-NMR Investigations of Sequence Distribution in Vinyl Alcohol-Vinyl Acetate Copolymers," Macromolecules, vol. 10, No. 3, 1977, pp. 532-535.

* cited by examiner

*Primary Examiner* — Jeffrey C Mullis
(74) *Attorney, Agent, or Firm* — Oblon, McClelland, Maier & Neustadt, L.L.P.

(57) ABSTRACT

An object of the present invention is to provide a modified vinyl alcohol polymer having a sulfonic acid or a salt thereof, the polymer having notably improved water solubility as compared with a pre-modified vinyl alcohol polymer. A modified vinyl alcohol polymer (A) has in a side chain thereof a sulfonic acid group or a salt thereof, and in the modified vinyl alcohol polymer (A), a degree of modification with the sulfonic acid group or the salt thereof is 0.01 mol % or more and 10 mol % or less, and a block character of residual vinyl ester units is 0.55 or more and 1 or less.

10 Claims, No Drawings

MODIFIED VINYL ALCOHOL POLYMER AND METHOD FOR PRODUCING SAME

TECHNICAL FIELD

The present invention relates to a modified vinyl alcohol polymer having in a side chain thereof a sulfonic acid group or a salt thereof, and a method for producing the same.

DISCUSSION OF THE BACKGROUND

Due to having a high rate of dissolution in water as compared with a general vinyl alcohol polymer (hereinafter, "vinyl alcohol polymer" may be abbreviated to "PVA"), a PVA having a sulfonic acid group is useful as, for example, a water-soluble film. In recent years, a procedure has come to be employed in which a chemical such as a pesticide, a laundry detergent, a bleaching agent, a toiletry product, an industrial chemical, or the like has been hermetically packaged in a certain equal quantity with a water-soluble film, and the chemical has been put into water in the packaged state upon use, whereby a content as well as the packaging film is dissolved or dispersed. Such a packaging format is referred to as "unit packaging" or the like. Advantages of the unit packaging are that a user can use a harmful chemical without making direct contact therewith upon use, that there is no need to measure the chemical upon use by virtue of its being packaged in the certain equal quantity, that no disposal is required of a container in which the chemical is packaged, and the like.

In terms of a method for producing a PVA having a sulfonic acid group, Patent Document 1 discloses a method in which a copolymer of a vinyl ester and an acrylamide-based polymerizable monomer having a sulfonic acid group is saponified. As another method for producing a PVA having a sulfonic acid group, Patent Document 2 discloses a method in which the PVA is swollen with water and an acetalization reaction using a sulfonic acid group-containing aldehyde is carried out in the presence of an acid catalyst. Patent Document 3 discloses a method in which a PVA is mixed with a sulfonic acid group-containing monomer, and next the sulfonic acid group is introduced by graft polymerizing the sulfonic acid group-containing monomer to the PVA.

PRIOR ART DOCUMENTS

Patent Documents

Patent Document 1: Japanese Unexamined Patent Application, Publication No. H7-118407
Patent Document 2: Japanese Unexamined Patent Application, Publication No. H10-101729
Patent Document 3: Japanese Unexamined Patent Application, Publication No. 2006-291161

SUMMARY OF THE INVENTION

Problems to be Solved by the Invention

However, in the method of Patent Document 1, hydrolysis of an acrylamide skeleton contained in the copolymer proceeds, consequently leading to a drawback in which an effect of the introduction of the sulfonic acid group is reduced due to the sulfonic acid group being released. Moreover, in methods such as those of Patent Documents 2 and 3, due to a reaction with a sulfonic acid group-containing compound being carried out following dissolution of the PVA in water, it is necessary to conduct multiple steps, such as a drying step, before obtaining a PVA powder to which the sulfonic acid group has been introduced. Further, the PVA having the sulfonic acid group to be obtained is, as compared with a PVA before introduction of the sulfonic acid group, insufficient with regard to an effect of improving water solubility.

The present invention was made in view of the foregoing circumstances, and an object of the invention is to provide a modified vinyl alcohol polymer having a sulfonic acid or a salt thereof, the polymer having markedly improved water solubility as compared with a pre-modified vinyl alcohol polymer. Furthermore, another object of the present invention is to provide a method for producing the modified vinyl alcohol polymer, whereby the modified vinyl alcohol polymer of the present invention can be easily obtained.

Means for Solving the Problems

As a result of thorough investigation, the present inventors have found that the aforementioned problems are solved by a modified vinyl alcohol polymer having: a sulfonic acid group or a salt thereof in a specific amount; and a block character of residual vinyl ester units falling within a certain range, and the like, and have consequently completed the present invention.

More specifically, an aspect of the present invention is a modified vinyl alcohol polymer (A), wherein the modified vinyl alcohol polymer (A) has in a side chain thereof a sulfonic acid group or a salt thereof, a degree of modification with the sulfonic acid group or the salt thereof is 0.01 mol % or more and 10 mol % or less, and a block character of residual vinyl ester units is 0.55 or more and 1 or less.

The modified vinyl alcohol polymer (A) preferably further includes an aromatic ring bonding to the sulfonic acid group or the salt thereof. Further, the salt is preferably an alkali metal salt.

A viscosity of a 4% by mass aqueous solution of the modified vinyl alcohol polymer (A) is preferably 2 mPa·s or more and 20 mPa·s or less. Furthermore, a degree of saponification of the modified vinyl alcohol polymer (A) is preferably 60 mol % or more and 99 mol % or less.

An other aspect of the present invention is a method for producing a modified vinyl alcohol polymer (A), the method including a step of mixing under a heating condition of 80° C. or higher and 240° C. or lower: a vinyl alcohol polymer (B), a viscosity of a 4% by mass aqueous solution thereof being 20 mPa·s or less; and an aldehyde having a sulfonic acid group or a salt thereof.

In the mixing, the vinyl alcohol polymer (B), and the aldehyde having the sulfonic acid group or the salt thereof are preferably mixed in a molten state. Moreover, the mixing is preferably conducted substantially without a solvent. Furthermore, in the mixing, it is preferable that substantially no catalyst is used.

Further, it is also preferable that a difference between a block character of residual vinyl ester units in the vinyl alcohol polymer (B), and the block character of residual vinyl ester units in the modified vinyl alcohol polymer (A) is 0.05 or more and 0.4 or less.

Effects of the Invention

The modified vinyl alcohol polymer of the aspect of the present invention has notably improved water solubility as compared with the pre-modified vinyl alcohol polymer.

Furthermore, according to the method of the other aspect of the present invention, such a modified vinyl alcohol polymer can be easily obtained.

DESCRIPTION OF EMBODIMENTS

Modified Vinyl Alcohol Polymer (A)

The modified vinyl alcohol polymer (A) of an embodiment of the present invention (hereinafter, may be abbreviated to "modified PVA (A)") has in a side chain thereof a sulfonic acid group (—SO$_3$H) or a salt thereof (a salt of the sulfonic acid group, e.g., —SO$_3$M, wherein M represents an alkali metal atom), a degree of modification with the sulfonic acid group or the salt thereof is 0.01 mol % or more and 10 mol % or less, and a block character of residual vinyl ester units is 0.55 or more and 1 or less.

Due particularly to the block character of the residual vinyl ester units falling within the certain range mentioned above, the modified PVA (A) of the embodiment of the present invention has notably improved water solubility as compared with the pre-modified vinyl alcohol polymer. Although the reason for this feature is not necessarily clarified, it is supposed that: due to the block character of the residual vinyl ester units decreasing, crystallinity of the modified PVA (A) decreases, and as a result, the water solubility improves.

It is to be noted that the modified PVA (A) is a polymer having vinyl alcohol units as primary repeating units. The lower limit of a proportion of all repeating units accounted for by the vinyl alcohol units in the modified PVA (A) is preferably 60 mol %, more preferably 70 mol %, and still more preferably 80 mol %. The upper limit of the proportion accounted for by the vinyl alcohol units is, for example, preferably 99.9 mol %, and more preferably 99 mol %.

The "salt (the salt of the sulfonic acid group)" as referred to herein means a group obtained by substituting a hydrogen ion of the sulfonic acid group (—SO$_3$H) with a cation such as a metal ion or an ammonium ion. As the salt (the salt of the sulfonic acid group), an alkali metal salt (—SO$_3$M, wherein M represents an alkali metal atom) is preferable, and a sodium salt (—SO$_3$Na) is more preferable.

The modified PVA (A) of the embodiment of the present invention preferably further includes an aromatic ring bonding to the sulfonic acid group or the salt thereof. The aromatic ring can be exemplified by a carbocyclic ring such as a benzene ring and a naphthalene ring, and a heterocyclic ring such as a furan ring and a pyridine ring, and is preferably the carbocyclic ring, and more preferably a benzene ring. The aromatic ring is preferably bonded to the sulfonic acid group or the salt thereof via a sulfur atom of the sulfonic acid group. The aromatic ring may be directly bonded to the sulfonic acid group or the salt thereof via the sulfur atom of the sulfonic acid group, or bonded through another linking chain (linking group); however, the aromatic ring is preferably directly bonded to the sulfonic acid group or the salt thereof.

The procedure for incorporating the sulfonic acid group or the salt thereof to the side chain of the vinyl alcohol polymer is exemplified by a procedure of acetalizing a vinyl alcohol polymer (B) (hereinafter, may be abbreviated to "PVA (B)") using an aldehyde having a sulfonic acid group or a salt thereof, as described later. Accordingly, the modified PVA (A) preferably has a structural unit represented by the following formula (I). It is to be noted that typically, a slight amount of the alkali catalyst used in saponification in the producing remains in the PVA (B). Thus, even if the aldehyde having the sulfonic acid group used in the acetalization is not a salt, the sulfonic acid group of the modified PVA (A) to be obtained can be in the state of a salt such as an alkali metal salt.

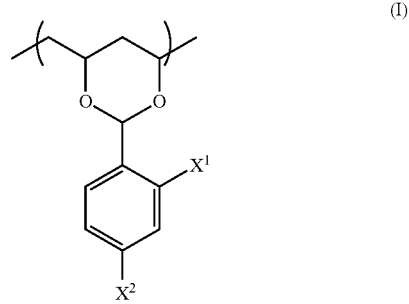

In the above formula (I), $X^1$ and $X^2$ each independently represent a hydrogen atom, a halogen atom, a hydroxyl group, —Z—SO$_3$Y, or an alkyl group having 1 to 4 carbon atoms, and at least one of $X^1$ and $X^2$ is —Z—SO$_3$Y, wherein each Y independently represents a hydrogen atom, a metal atom, or an ammonium group, and each Z independently represents a single bond or a linking group.

Examples of the metal atom which may be represented by Y include an alkali metal atom (e.g., a lithium atom, a sodium atom, and a potassium atom), an alkaline earth metal atom (e.g., a calcium atom), and the like. Of these, in light of solubility of the film or the like to be obtained, Y represents preferably a hydrogen atom or the alkali metal atom, more preferably a hydrogen atom or a sodium atom, and still more preferably a sodium atom. It is to be noted that in a case in which Y represents a metal atom having a valency of two or more such as an alkaline earth metal atom, Y may form a cross-linked structure bonded to two or more —SO$_3$—.

The linking group which may be represented by Z is exemplified by a divalent hydrocarbon group, as well as —O—, —CO—, —COCO—, —CO(CH$_2$)$_m$CO—, —CH(OH)—, —S—, —CS—, —SO—, —SO$_2$—, —NR$^1$—, —CONR$^1$—, —NR$^1$CO—, —CSNR$^1$—, —NR$^1$CS—, —NR$^1$NR$^1$—, —HPO$_4$—, —Si(OR$^1$)$_2$—, —OSi(OR$^1$)$_2$—, —OSi(OR$^1$)$_2$O—, —Ti(OR$^1$)$_2$—, —OTi(OR$^1$)$_2$—, —OTi(OR$^1$)$_2$O—, —Al(OR$^1$)—, —OAl(OR$^1$)—, —OAl(OR$^1$)O—, and the like. In these linking groups, each R$^1$ independently represents an optional substituent, and preferably represents a hydrogen atom or an alkyl group. Further, m is a natural number from 1 to 10. Moreover, examples of the divalent hydrocarbon group include divalent aliphatic hydrocarbon groups such as an alkylene group, an alkenylene group, and an alkynylene group; and divalent aromatic hydrocarbon groups such as a phenylene group and a naphthylene group. A part or all of hydrogen atoms in each of these hydrocarbons may be substituted with a halogen atom such as a fluorine atom, a chlorine atom, or a bromine atom, or the like. Z represents preferably a single bond.

In light of reactivity of the aldehyde used for the acetalization, it is preferable that $X^1$ is —Z—SO$_3$Y, and $X^2$ is a hydrogen atom, a halogen atom, a hydroxyl group, —Z—SO$_3$Y, or an alkyl group having 1 to 4 carbon atoms. It is supposed that because —Z—SO$_3$Y which may be represented by $X^1$ acts as an intramolecular acid catalyst due to being bonded to a carbon atom at an ortho position with respect to a carbon atom of an aromatic ring to which the aldehyde is bonded, the reactivity of the aldehyde is even further improved. Examples of the halogen atom include a fluorine atom, a chlorine atom, a bromine atom, an iodine atom, and the like, and of these, a chlorine atom or a bromine atom is preferred. The alkyl group having 1 to 4 carbon atoms may be linear or branched; examples include a methyl group, an ethyl group, an n-propyl group, an isopropyl group, an n-butyl group, an isobutyl group, a sec-butyl group, and the like, and of these, a methyl group or an ethyl group is preferred. $X^2$ more preferably represents a hydrogen atom, a chlorine atom, a hydroxyl group, a methyl group, or —SO$_3$Y, and still more preferably represents a hydrogen atom.

In the modified PVA (A), the lower limit of the degree of modification with the sulfonic acid group or the salt thereof is 0.01 mol %, preferably 0.05 mol %, more preferably 0.1 mol %, particularly preferably 0.2 mol %, and most preferably 0.3 mol %. In a case in which the degree of modification with the sulfonic acid group or the salt thereof is less than the lower limit, improvement of the water solubility as compared with the pre-modified PVA (B) may be insufficient. Meanwhile, the upper limit of the degree of modification with the sulfonic acid group or the salt thereof is 10 mol %, preferably 7 mol %, more preferably 5 mol %, and particularly preferably 3 mol %. In a case in which the degree of modification with the sulfonic acid group or the salt thereof exceeds the upper limit, mechanical strength of the film or the like formed from the modified PVA (A) may be insufficient.

The "degree of modification with the sulfonic acid group or the salt thereof" as referred to herein means a proportion of a total number of moles of the sulfonic acid group and the salt thereof, with respect to the number of moles of all repeating units in the modified PVA (A). It is to be noted that herein, a structure represented by —CR$_2$—CR$_2$— is recognized as one repeating unit, wherein each R independently represents a hydrogen atom or an optional substituent, and two Rs each contained in identical or different structural units may be bonded. For example, the structural unit represented by the above formula (I) is recognized to consist of two repeating units. Meanwhile, the vinyl alcohol units, the residual vinyl ester units, structural units derived from other monomers, and the like are each recognized to consist of one repeating unit. In other words, structures used for polymerization and corresponding to monomers having a carbon-carbon double bond are the repeating units.

The degree of modification with the sulfonic acid group or the salt thereof can be determined by $^1$H-NMR spectroscopy of the modified PVA (A). For example, in a case in which the modified PVA (A) is obtained through an acetalization reaction using sodium benzaldehyde-2-sulfonate, the modified PVA (A) is dissolved in DMSO-d$_6$, and measured using $^1$H-NMR at 400 MHz. Peaks at 4.2 to 5.2 ppm (integral value a) are attributed to methine in vinyl alcohol units and peaks at around 7.0 to 8.0 ppm (integral value 13) are attributed to a benzene ring of sodium benzaldehyde-2-sulfonate, and the degree of modification with the sulfonic acid group or the salt thereof is calculated using the following equation.

Degree of modification with sulfonic acid group or salt thereof=$\{(\beta/4)/\alpha\} \times 100$ In the modified PVA (A), the lower limit of the block character of the residual vinyl ester units is 0.55, preferably 0.58, and more preferably 0.6. When the block character is less than the lower limit, improvement of the water solubility as compared with the pre-modified PVA (B) may be insufficient. Meanwhile, the upper limit of the block character is 1, preferably 0.9, more preferably 0.85, and still more preferably 0.8. In a case in which the block character exceeds the upper limit, it may be difficult to produce the modified PVA (A).

It is to be noted that the block character described above is a value representing distribution of residual esters (typically alkoxycarbonyl groups) and hydroxyl groups formed by saponification of esters, and can fall within a numerical range of 0 to 2. "0" indicates that residual esters or hydroxyl groups are distributed completely as blocks, and as the value increases, alternation increases: "1" indicates that residual esters and hydroxyl groups are present completely at random, and "2" indicates that residual esters and hydroxyl groups are present completely alternately. The "residual esters" as referred to herein mean esters (—O—C(=O)-Q (where Q represents a hydrocarbon group other than CH$_2$=CH—O—C(=O)) contained in the vinyl ester monomer)) contained in the vinyl ester units in the modified PVA (A) to be obtained by saponification. In other words, the block character is a value representing the distribution of the residual vinyl ester units and the vinyl alcohol units. It is to be noted that the block character can be determined by $^{13}$C-NMR spectroscopy, as described later in Examples. In a case in which the modified PVA (A) has other repeating unit(s) aside from the vinyl ester units and/or the vinyl alcohol units, the block character is calculated for all the sequences of the vinyl ester units and/or the vinyl alcohol units.

The block character mentioned above can be adjusted by changing a type of the vinyl ester monomer, saponification conditions such as a catalyst and a solvent, a heat treatment after the saponification, and the like. Of these, in a case of conducting the saponification by a general procedure, the block character is typically less than 0.55, but the block character can be set to a value of 0.55 or more by way of a reaction in heating thereafter.

The lower limit of a viscosity of the 4% by mass aqueous solution of the modified PVA (A) is preferably 2 mPa·s, more preferably 2.5 mPa·s, and still more preferably 3 mPa·s. Meanwhile, the upper limit of the viscosity of the 4% by mass aqueous solution of the modified PVA (A) is preferably 20 mPa·s, more preferably 15 mPa·s, and still more preferably 10 mPa·s. In a case in which the viscosity of the 4% by mass aqueous solution of the modified PVA (A) is less than the lower limit, the mechanical strength of a film or the like obtained using the modified PVA (A) is likely to decrease. Conversely, in a case in which the viscosity of the 4% by mass aqueous solution of the modified PVA (A) exceeds the upper limit, gelation is likely to occur in heating. The viscosity of the 4% by mass aqueous solution of the modified PVA (A) is a value measured using a B-type viscometer under conditions involving a rotor having a number of revolutions of 60 rpm, and a temperature of 20° C. Examples of the B-type viscometer which may be used include commercially available products such as "BLII," a B-type viscometer (manufactured by Toki Sangyo Co., Ltd.); "BASE" (product name), a digital B-type viscometer (manufactured by Atago Co., Ltd.); "PRO" (product name), a digital B-type viscometer (manufactured by Atago Co., Ltd.); and the like.

The lower limit of the degree of saponification of the modified PVA (A) is preferably 60 mol %, more preferably 65 mol %, still more preferably 70 mol %, particularly preferably 80 mol %, and most preferably 85 mol %. Meanwhile, the upper limit of the degree of saponification of the modified PVA (A) is preferably 99 mol %, more preferably 98 mol %, and still more preferably 97 mol %. When the degree of saponification of the modified PVA (A) is equal to or more than the lower limit, the effect of improving water solubility can be further increased as compared with the pre-modified PVA (B). Conversely, when the degree of saponification exceeds the upper limit, it may not be possible to stably produce the modified PVA (A) industrially, and it is likely that stably carrying out film formation from such a modified PVA (A) will not be possible. The degree of saponification of the modified PVA (A) is measured according to a procedure disclosed in JIS-K6726-1994.

The modified PVA (A) can be used for a variety of intended usages. These intended usages are exemplified below, but are not limited thereto.

(1) Vinyl chloride dispersant usages: dispersion stabilizers and dispersion aids for suspension polymerization of vinyl chloride or vinylidene chloride (2) Coating material usages: sizing agents, fiber processing agents, leather finishers, paints, anti-fogging agents, metal corrosion inhibitors, gloss agents for galvanized substance(s), and antistatic agents (3) Adhesive/binder usages: adhesives, agglutinants, remoistenable adhesives, various binders, and additives for cements, mortars, etc.

(4) Dispersion stabilizer usages: dispersion stabilizers for organic/inorganic pigments for paints, adhesives, etc., dispersion stabilizers for emulsion polymerization of various vinyl compounds, and post emulsifiers for bitumen, etc.

(5) Paper processing usages: paper strengthening agents, agents for imparting oil resistance/solvent resistance, smoothness-improving agents, surface gloss-improving aids, wood fillers, barrier agents, agents for imparting light resistance, water-proofing agents, dye/developer dispersants, adhesiveness improving agents, and binders (6) Agricultural usages: binders for pesticides, spreaders for pesticides, agricultural coating materials, soil improving agents, erosion inhibitors, and dispersants for pesticides (7) Medical/cosmetic usages: granulate binders, coating agents, emulsifying agents, skin patches, binding agents, bases for film formulations, and film-forming agents (8) Viscosity adjusting agent usages: thickening agents and rheology-adjusting agents (9) Aggregating agent usages: agents for aggregating solids suspended in water and for dissolved matter, and metal aggregating agents

(10) Film usages: water-soluble films, polarized films, barrier films, films for wrapping textile products, seed germination sheets, vegetation sheets, seed tapes, and hygroscopic films

(11) Molded article usages: fibers, pipes, tubes, anti-leak films, water-soluble fibers for chemical laces, and sponges

(12) Usages as raw materials for resins: raw materials for polyvinyl butyral, raw materials for photosensitive resins, raw materials for graft polymers, and raw materials for various gels

(13) Post-reaction usages: post-reaction usages with low-molecular organic compounds, high-molecular organic compounds, and inorganic compounds Of these, the film usages are preferred, and a film usage for unit packaging is more preferred. Furthermore, the modified PVA (A) can also be suitably used as a forming material for a water-soluble film. The water-soluble film may be such that at a size of 40 mm×40 mm, it is completely dissolvable in 1 liter of water at a temperature of 20° C.

Method for Producing Modified PVA (A)

The modified PVA (A) can be produced by, for example, polymerizing a vinyl ester monomer to obtain a vinyl ester polymer, saponifying the vinyl ester polymer in an alcohol solution using an alkali catalyst to obtain the PVA (B), and mixing under a heating condition the PVA (B) thus obtained and an aldehyde having a sulfonic acid group or a salt thereof.

Examples of the vinyl ester monomer include vinyl formate, vinyl acetate, vinyl propionate, vinyl valerate, vinyl caprate, vinyl laurate, vinyl stearate, vinyl benzoate, vinyl pivalate, vinyl versatate, and the like. Of these, vinyl acetate is preferred.

The procedure of polymerizing the vinyl ester monomer is exemplified by a well-known procedure such as a bulk polymerization procedure, a solution polymerization procedure, a suspension polymerization procedure, an emulsion polymerization procedure, and the like. Of these procedures, the bulk polymerization procedure performed without a solvent and the solution polymerization procedure performed with a solvent such as an alcohol or the like are preferred, and in light of enhancing the effects of the present invention, the solution polymerization procedure in which the polymerization is performed in the presence of a lower alcohol is more preferred. The lower alcohol is preferably an alcohol having 3 or fewer carbon atoms; more preferably methanol, ethanol, n-propanol, or isopropanol; and still more preferably methanol. In carrying out a polymerization reaction by the bulk polymerization procedure or the solution polymerization procedure, in terms of a reaction system, either of a batchwise system or a continuous system can be employed.

An initiator to be used in the polymerization reaction is exemplified by well-known initiators, e.g., azo initiators such as 2,2'-azobisisobutyronitrile, 2,2'-azobis(2,4-dimethylvaleronitrile), and 2,2'-azobis(4-methoxy-2,4-dimethylvaleronitrile); organic peroxide initiators such as benzoyl peroxide and n-propyl peroxycarbonate; and the like. A polymerization temperature at a time of conducting the polymerization reaction is not particularly limited, and a range of 5° C. or higher and 200° C. or lower is appropriate.

In polymerizing the vinyl ester monomer (may be also referred to as "polymerizing step"), copolymerizable monomer(s) can be further copolymerized within a range not impairing the principles of the present invention. Examples of such a monomer include: α-olefins such as ethylene, propylene, 1-butene, isobutene, and 1-hexene; (meth)acrylic acid and salts thereof; (meth)acrylic acid esters such as methyl (meth)acrylate and ethyl (meth)acrylate; acrylamide derivatives such as N-methylacrylamide and N-ethylacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether, and n-butyl vinyl ether; hydroxyl group-containing vinyl ethers such as ethylene glycol vinyl ether, 1,3-propanediol vinyl ether, and 1,4-butanediol vinyl ether; allyl acetate; allyl ethers such as propyl allyl ether, butyl allyl ether, and hexyl allyl ether; oxyalkylene group-containing monomers; isopropenyl acetate; hydroxy group-containing α-olefins such as 3-buten-1-ol, 4-penten-1-ol, 5-hexen-1-ol, 7-octen-1-ol, 9-decen-1-ol, and 3-methyl-3-buten-1-ol; unsaturated carboxylic acids such as maleic acid, itaconic acid, and fumaric acid, and their salts or esters of the same; sulfonic acid group-containing monomers such as ethylenesulfonic acid, allyl sulfonic acid, methallyl sulfonic acid, and 2-acrylamide-2-methylpropanesulfonic acid; silyl group-containing monomers such as vinyltrimethoxysilane, vinylmethyldimethoxysilane, vinyldimethylmethoxysilane, and vinyltriethoxysilane; and the like. The upper limit of an amount of these monomers to be used may vary depending on the object of usage, the intended usage, and the like, but with respect to total monomers, is preferably 20 mol %, and more preferably 10 mol %.

For the saponification reaction of the vinyl ester polymer obtained in the polymerizing step, an alcoholysis or hydrolysis reaction using a conventionally well-known basic catalyst such as sodium hydroxide, potassium hydroxide, or sodium methoxide can be adopted. Examples of the solvent to be used in the saponification reaction include: alcohols such as methanol and ethanol; esters such as methyl acetate and ethyl acetate; ketones such as acetone and methyl ethyl ketone; aromatic hydrocarbons such as benzene and toluene; and the like. These can be used alone, or as a combination of two or more types thereof. Of these, due to convenience, it is preferable to use as the solvent, methanol or a mixed solution of methanol and methyl acetate, and to conduct the saponification reaction in the presence of sodium hydroxide that serves as the basic catalyst. Through such a procedure, the PVA (B) can be obtained.

The block character of the residual vinyl ester units in the PVA (B) obtained through the saponification reaction is, for example, 0.2 or more and less than 0.55, and may be 0.4 or more and 0.5 or less. Furthermore, the degree of modification with the sulfonic acid group or the salt thereof in the PVA (B) (the proportion of the number of total moles of the sulfonic acid group and the salt thereof with respect to the number of moles of all repeating units in the PVA (B)) is preferably less than 0.01 mol % and more preferably less than 0.001 mol %, and may be substantially 0 mol %.

The modified PVA (A), i.e., the PVA (B) acetalized by the aldehyde, can be obtained by conducting a step (hereinafter, may be also referred to as "mixing step") in which the PVA (B) obtained as described above is mixed with the aldehyde having the sulfonic acid group or the salt thereof under a heating condition of 80° C. or higher and 240° C. or lower. In light of inhibiting gelation during the heating, a viscosity of a 4% by mass aqueous solution of the PVA (B) may be 20 mPa·s or less. Suitable ranges for the viscosity of the 4% by mass aqueous solution of the PVA (B) and the degree of saponification thereof are identical to the ranges for the modified PVA (A), described above.

The aldehyde having the sulfonic acid group or the salt thereof (the salt of the sulfonic acid group) is not particularly limited, and for example, a compound represented by the following formula (II) can be used.

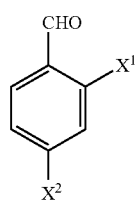

(II)

In the above formula (II), definitions of and preferable ranges for $X^1$ and $X^2$ are similar to those in the above formula (I). Examples of the compound which may be represented by the above formula (II) include benzaldehyde-2-sulfonic acid, benzaldehyde-2,4-disulfonic acid, 4-chlorobenzaldehyde-2-sulfonic acid, 4-methylbenzaldehyde-2-sulfonic acid, 4-hydroxylbenzaldehyde-2-sulfonic acid, their salts, and the like. Of these, in light of availability, benzaldehyde-2-sulfonic acid and benzaldehyde-2,4-disulfonic acid are preferred. The salt is exemplified by an alkali metal salt, an alkaline earth metal salt, an ammonium salt, and the like, and of these, the alkali metal salt is preferred, and a sodium salt is more preferred. In other words, examples of a suitable aldehyde having the salt of the sulfonic acid group include sodium benzaldehyde-2-sulfonate, disodium benzaldehyde-2,4-disulfonate, and the like.

The lower limit of an amount of addition of the aldehyde having the sulfonic acid group or the salt thereof with respect to 100 parts by mass of the PVA (B) is preferably 0.1 parts by mass, more preferably 0.5 parts by mass, and still more preferably 1 part by mass. Meanwhile, the upper limit of the amount of addition of the aldehyde having the sulfonic acid group or the salt thereof with respect to 100 parts by mass of the PVA (B) is preferably 50 parts by mass, more preferably 40 parts by mass, and still more preferably 30 parts by mass.

The lower limit of a temperature of the heating (heating temperature) is 80° C., preferably 100° C., more preferably 130° C., and still more preferably 150° C. Meanwhile, the upper limit of the heating temperature is 240° C., preferably 230° C., more preferably 220° C., and still more preferably 210° C. In the heating, the PVA (B) and the aldehyde having the sulfonic acid group or the salt thereof are preferably mixed in a molten state. In a case in which the heating temperature is lower than the lower limit, the reaction may not proceed sufficiently, and it may not be possible to produce the modified PVA (A) fulfilling the degree of modification with the sulfonic acid group or the salt thereof as defined by the present invention. In a case in which the heating temperature is higher than the upper limit, the PVA (B) may degrade, and/or gelation may occur. It is to be noted that the molten state is acceptable as long as it can be confirmed that at least the PVA (B) has melted.

The time period (mixing time period) for mixing the PVA (B) and the aldehyde having the sulfonic acid group or the salt thereof under a heating condition is not particularly limited, and the lower limit of the mixing time period is preferably 1 min, more preferably 3 min, and still more preferably 4 min. Meanwhile, the upper limit of the mixing time period is preferably 3 hrs, more preferably 2 hrs, still more preferably 1 hr, and particularly preferably 30 min. By setting the mixing time period to be equal to or more than the lower limit, the reaction can be allowed to proceed sufficiently. By setting the mixing time period to be equal to or less than the upper limit, degradation of the PVA (B) and/or the occurrence of gelation can be inhibited.

The procedure of mixing the PVA (B) and the aldehyde having the sulfonic acid group or the salt thereof is not particularly limited, and for example, following dry blending using a ribbon blender, a Henschel mixer, a V blender, or the like, a known mixing apparatus or kneading apparatus such as a kneader rudder, a uniaxial or biaxial extruder, a mixing roll, a Banbury mixer, or the like may be used. Of these, a procedure in which the mixing is conducted in a molten state using the uniaxial or biaxial extruder having sufficient kneading power is preferred.

In the mixing step, the mixing is preferably conducted substantially without a solvent. More specifically, the mixing is preferably a procedure in which a powder composed of the PVA (B), and a powder composed of the aldehyde having the sulfonic acid group or the salt thereof are mixed under the heating condition described above to permit the acetalization. In this step, depending upon the heating temperature, the powder composed of the PVA (B), and the powder composed of the aldehyde having the sulfonic acid group or the salt thereof may be mixed in a powdered state or in a molten state, and in light of improvement of reactivity, mixing in the molten state is preferred. Since, according to the method of the other embodiment of the present invention, the mixing can be conducted substantially without a solvent, a drying step of eliminating a solvent or the like is unnecessary; accordingly, the modified PVA (A) can be more easily produced. It is to be noted that "substantially without a solvent" as referred to herein means that no solvent is intentionally added to the mixture of the PVA (B) and the aldehyde having the sulfonic acid group or the salt thereof.

In the mixing step, it is preferable that substantially no catalyst is used. Usually, in the acetalization reaction in the solution, in order to advantageously carry out the reaction, an acid catalyst, e.g., an inorganic acid such as sulfuric acid, hydrochloric acid, or phosphoric acid, or an ammonium salt thereof is used by adding the acid catalyst such that the pH of the reaction system becomes 5 or less. After completion of the reaction, a step of neutralizing as necessary with an alkaline substance is needed. Since according to the method of the other embodiment of the present invention, the acetalization can be advanced substantially without using a catalyst, a neutralization step or the like is unnecessary; thus, the modified PVA (A) can be produced more easily. It is to be noted that "substantially no catalyst is used" means that no catalyst is intentionally added in the mixing step.

In the mixing step, a plasticizer or the like may be further added in order to lower a melting/softening temperature. Examples of the plasticizer include: polyhydric alcohols such as glycerin, diglycerin, ethylene glycol, diethylene glycol, triethylene glycol, propylene glycol, dipropylene glycol, trimethylolpropane, pentaerythritol, 1,3-butanediol, and 2-methyl-1,3-propanediol; polyethers such as polyethylene glycol and polypropylene glycol; polyvinylamides such as polyvinylpyrrolidone; amide compounds such as N-methylpyrrolidone and dimethylacetamide; compounds obtained by adding ethylene oxide to a polyhydric alcohol such as glycerin, pentaerythritol, or sorbitol; and the like.

An amount of addition of the plasticizer is not particularly limited, and the lower limit is, with respect to 100 parts by mass of the PVA (B), preferably 3 parts by mass, more preferably 5 parts by mass, and still more preferably 10 parts by mass. Meanwhile, the upper limit of the amount of addition of the plasticizer with respect to 100 parts by mass of the PVA (B) is preferably 40 parts by mass, more preferably 30 parts by mass, and still more preferably 20 parts by mass. When the amount of addition of the plasticizer falls within the above range, the modified PVA (A) can be produced such that the film or the like to be obtained has favorably balanced water solubility and mechanical strength.

By carrying out the mixing step in the method for producing the modified PVA (A), the PVA (B) is converted into the modified PVA (A), and the block character of the modified PVA (A) increases as compared with the block character of the PVA (B). The lower limit of a difference between the block character of the residual vinyl ester units in the PVA (B) and the block character of the residual vinyl ester units in the modified PVA (A) is preferably 0.05, more preferably 0.08, and still more preferably 0.1. The upper limit of the difference between the block characters is preferably 0.4, more preferably 0.35, and still more preferably 0.3. When the difference between the block characters of the residual vinyl ester units falls within the above range, the modified PVA (A) having even further improved water solubility as compared with the pre-modified vinyl alcohol polymer can be obtained.

EXAMPLES

Hereinafter, the present invention is more specifically explained by way of Examples. Hereinafter, "parts" and "%" have meanings on a mass basis unless otherwise specified particularly.

Viscosity of 4% by Mass Aqueous Solution of PVA

The viscosity of a 4% by mass aqueous solution of each PVA (including the modified PVA) was measured using "BLII," a B-type viscometer manufactured by Toki Sangyo Co., Ltd., under conditions involving a rotor having a number of revolutions of 60 rpm, and a temperature of 20° C.

Degree of Saponification of PVA

The degree of saponification of each PVA (including the modified PVA) was determined according to a procedure disclosed in JIS-K6726-1994.

Degree of Modification in Modified PVA (A) with Sulfonic Acid Group or Salt Thereof The degree of modification in each modified PVA (A) with a sulfonic acid group or a salt thereof was determined based on a procedure using $^1$H-NMR, as described above.

Block Character of PVA

The block character of residual vinyl ester units in each PVA (including the modified PVA) was determined in the following manner. The PVA was dissolved in a mixed solvent of deuterated water/deuterated methanol to obtain a sample. The sample was subjected to $^{13}$C-NMR spectroscopy at a measurement temperature of 70° C., and 18,000 scans were accumulated. Then, three peaks in the dyad present in the methylene region were analyzed so as to calculate the block character from the integrated values of these peaks. The three peaks correspond to: a peak of methylene carbon sandwiched between a carbon atom in the main chain bonded to a residual ester (—O—C(=O)-Q, where Q is a hydrocarbon group as defined above) and another carbon atom in the main chain bonded to a hydroxyl group; a peak of methylene carbon sandwiched between a carbon atom in the main chain bonded to a residual ester and another carbon atom in the main chain positioned close to the carbon atom and bonded to another residual ester; and a peak of methylene carbon sandwiched between a carbon atom in the main chain bonded to a hydroxyl group and another carbon atom in the main chain positioned close to the carbon atom and bonded to another hydroxyl group. The $^{13}$C-NMR spectroscopy and the calculation of the block character are described in "Poval" (Kobunshi Kanko Kai, published in 1984, pp. 246 to 249) and Macromolecules, 10, 532 (1977).

Evaluation Procedure for Improvement of Water Solubility of Film

Each modified PVA (A) obtained from the Examples and Comparative Examples described later was dissolved in water to prepare a 10% by mass aqueous solution of each modified PVA (A). The aqueous solution was cast and dried at 20° C. to obtain a film having a thickness of 76 μm. The film was cut into a square measuring 40 mm×40 mm, and this square was inserted into a slide mount. Separately, one liter of distilled water was charged into a glass beaker having a capacity of one liter and the glass beaker was placed in a thermostat bath adjusted to 20° C., and the distilled water was stirred at 250 rpm using a 5 cm rotor. After the temperature of the distilled water in the glass beaker reached 20° C., the slide mount was submerged in the cold water under stirring, and measurement of the water solubility was started. Then the dissolution state of the film was visually observed, and a time period in δ (seconds) until the film of the modified PVA (A) had completely dissolved was measured. Furthermore, a film of each pre-modified PVA (B) having a thickness of 76 was produced following a procedure similar to that of the modified PVA (A), and a time period in γ (seconds) until the film of the PVA (B) thus obtained had completely dissolved was measured following a procedure similar to that of the modified PVA (A). Based on the difference between γ (seconds) and δ (seconds), evaluations were carried out according to the following criteria.

A: 30 sec or more
B: 20 sec or more and less than 30 sec
C: 10 sec or more and less than 20 sec
D: Less than 10 sec Example 1

A mixture was obtained by dry blending: 100 parts by mass of a PVA (B), with a viscosity of a 4% by mass aqueous solution thereof being 8 mPa·s, a degree of saponification thereof being 88 mol %, and a block character of residual vinyl ester units being 0.52; and 21.2 parts by mass of sodium benzaldehyde-2-sulfonate, as an aldehyde having the sulfonic acid group or the salt thereof. It is to be noted the PVA (B) used was obtained by saponifying a vinyl ester polymer using an alkali catalyst, and that the same applies to the following Examples and Comparative Examples. The mixture thus obtained was melt kneaded, and then cooled to give pellets of a modified PVA (A) to which a salt of a sulfonic acid group had been introduced in a side chain thereof. Conditions for the melt kneading are as indicated below. Specifically, the modified PVA (A) obtained had the structural unit represented by the above formula (I), in which $X^1$ was —$SO_3Na$ and $X^2$ was a hydrogen atom. The viscosity of a 4% by mass aqueous solution of the modified PVA(A) was 7.5 mPa·s, the degree of saponification thereof was 88%, the degree of modification with the sulfonic acid group or the salt thereof was 2 mol %, and the block character of the residual ester units was 0.65. Improvement of the water solubility of the film was evaluated according to the above procedure. The results are shown in Table 1.

Melt Kneading Conditions
Apparatus: "Laboplast Mill 4C150," manufactured by Toyo Seiki Seisaku-sho, Ltd.
Jacket temperature during kneading: 180° C.
Time period of kneading: 5 min Examples 2 to 4

For each of Examples 2 to 4, a modified PVA (A) was produced in a similar manner to Example 1, except that a type of the PVA (B), a type and amount of an aldehyde having the sulfonic acid group or a salt thereof, and a temperature and time period of melt kneading were as shown in Table 1. For each modified PVA (A) obtained, improvement of the water solubility of the film was evaluated according to a procedure similar to that of Example 1. The results are shown in Table 1.

Comparative Example 1

A 10% by mass aqueous solution was prepared using 100 parts by mass of a PVA (B), with a viscosity of a 4% by mass aqueous solution thereof being 8 mPa·s, a degree of saponification thereof being 88 mol %, and a block character of residual vinyl ester units being 0.52; and while keeping the temperature of the aqueous solution at 50° C., 5.3 parts by mass of sodium benzaldehyde-2-sulfonate were added thereto and the mixture was stirred well. A 1.0 N hydrochloric acid was then added thereto such that a pH of the aqueous solution became 2.0. The aqueous solution was maintained in this state for 6 hrs to allow a reaction, and then sodium hydroxide was added to permit neutralization. A reaction product thus obtained was purified, thereby giving a modified PVA (A). The viscosity of a 4% by mass aqueous solution of the modified PVA(A) was 8 mPa·s, the degree of saponification thereof was 92%, the degree of modification with the sulfonic acid group or the salt thereof was 0.5 mol %, and the block character of the residual ester units was 0.52. For the modified PVA (A) obtained, improvement of the water solubility of the film was evaluated according to a procedure similar to that of Example 1. The results are shown in Table 1.

Comparative Example 2

An attempt was made to produce a modified PVA (A) in which a PVA (B) to be used was similar to Example 1, except that a type of the PVA (B) and a type and amount of an aldehyde having a sulfonic acid group or a salt thereof were as shown in Table 1; however, because of the viscosity of the 4% by mass aqueous solution of the PVA (B) being more than 20 mPa·s, gelation occurred during the melt kneading; thus, it was not possible to obtain the modified PVA (A).

TABLE 1

| | PVA (B) | | | Aldehyde having sulfonic acid group or salt thereof | | Production conditions | |
|---|---|---|---|---|---|---|---|
| | 4% viscosity (mPa · s) | degree of saponification (mol %) | block character | type | usage amount (parts) | temperature of kneading (° C.) | time period of kneading (min) |
| Example 1 | 8 | 88 | 0.52 | sodium benzaldehyde-2-sulfonate | 21.2 | 180 | 5 |
| Example 2 | 5 | 74 | 0.43 | sodium benzaldehyde-2-sulfonate | 1.9 | 180 | 5 |
| Example 3 | 5 | 74 | 0.43 | sodium benzaldehyde 2-sulfonate | 3.8 | 180 | 5 |
| Example 4 | 5 | 74 | 0.43 | disodium benzaldehyde-2,4-disulfonate | 5.7 | 180 | 5 |

TABLE 1-continued

| | | | | | | | |
|---|---|---|---|---|---|---|---|
| Comparative Example 1 | 8 | 88 | 0.52 | sodium benzaldehyde-2-sulfonate | 5.3 | — | — |
| Comparative Example 2 | 22 | 88 | 0.50 | sodium benzaldehyde-2-sulfonate | 4.2 | 180 | 5 |

| | Modified PVA (A) | | | | Physical properties |
|---|---|---|---|---|---|
| | 4% viscosity (mPa·s) | degree of saponification (mol %) | degree of modification (mol %) | block character | improvement of water solubility |
| Example 1 | 7.5 | 88 | 2 | 0.65 | A |
| Example 2 | 4 | 74 | 0.25 | 0.72 | C |
| Example 3 | 4.5 | 74 | 0.5 | 0.70 | B |
| Example 4 | 4.5 | 74 | 0.6 | 0.63 | B |
| Comparative Example 1 | 8 | 92 | 0.5 | 0.52 | D |
| Comparative Example 2 | — | — | — | — | — |

The results shown in Table 1 indicate that the modified PVA (A) having in a side chain thereof a certain amount of the sulfonic acid group or the salt thereof, and having the block character of residual vinyl ester units falling within a certain range, enables obtaining a film having notably improved water solubility as compared with the pre-modified PVA (B). Meanwhile, in the case of carrying out acetalization in the aqueous solution as in Comparative Example 1, the block character of the residual vinyl ester units in the modified PVA (A) obtained is so low that improvement in water solubility is not apparent as compared with the pre-modified PVA (B).

INDUSTRIAL APPLICABILITY

The modified PVA of the embodiment of the present invention can be suitably used as a material for a water-soluble film or the like.

The invention claimed is:

1. A modified vinyl alcohol polymer comprising in a side chain thereof a sulfonic acid group or a salt thereof, wherein
a degree of modification with the sulfonic acid group or the salt thereof is from 0.01 mol % to 10 mol %, and
a block character of residual vinyl ester units is from 0.55 to 1.

2. The modified vinyl alcohol polymer according to claim 1, further comprising an aromatic ring bonding to the sulfonic acid group or the salt thereof.

3. The modified vinyl alcohol polymer according to claim 1, wherein the salt is an alkali metal salt.

4. The modified vinyl alcohol polymer according to claim 1, wherein a viscosity of a 4% by mass aqueous solution thereof is from 2 mPa·s to 20 mPa·s.

5. The modified vinyl alcohol polymer according to claim 1, wherein a degree of saponification thereof is from 60 mol % to 99 mol %.

6. A method for producing the modified vinyl alcohol polymer according to claim 1, the method comprising:
mixing under a heating condition of from 80° C. to 240° C.: a vinyl alcohol polymer having a viscosity of a 4% by mass aqueous solution thereof being 20 mPa·s or less; and an aldehyde comprising a sulfonic acid group or a salt thereof.

7. The method according to claim 6, wherein in the mixing, the vinyl alcohol polymer, and the aldehyde comprising the sulfonic acid group or the salt thereof are mixed in a molten state.

8. The method according to claim 6, wherein the mixing is conducted substantially without a solvent.

9. The method according to claim 6, wherein in the mixing, substantially no catalyst is used.

10. The method according to claim 6, wherein a difference between a block character of residual vinyl ester units in the vinyl alcohol polymer and the block character of the residual vinyl ester units in the modified vinyl alcohol polymer is from 0.05 to 0.4.

* * * * *